UNITED STATES PATENT OFFICE.

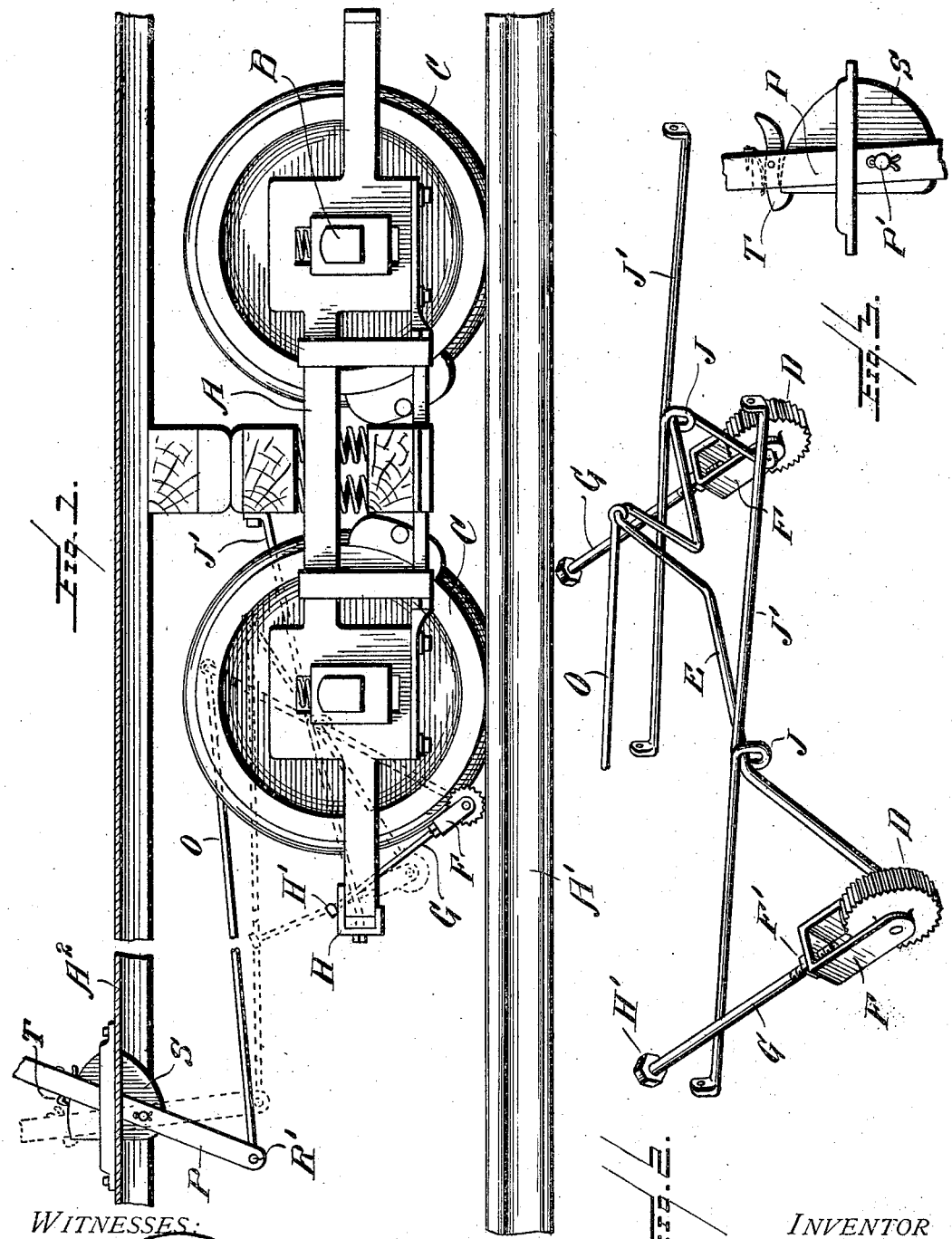

PHILLIP WILLIAM COUNSELMAN, OF TOLEDO, OHIO.

EMERGENCY-BRAKE FOR RAILWAY-CARS.

No. 847,319. Specification of Letters Patent. Patented March 19, 1907.

Application filed December 26, 1906. Serial No. 349,520.

*To all whom it may concern:*

Be it known that I, PHILLIP WILLIAM COUNSELMAN, a citizen of the United States, residing at Toledo, in the county of Lucas and State of Ohio, have invented certain new and useful Improvements in Emergency-Brakes for Railway-Cars; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in emergency-brakes for railway-cars, and consists, essentially, in the provision of a corrugated wheel or roller mounted upon a crank-shaft and adapted to be thrown intermediate the wheel of the truck of a car and the track, thereby serving to securely brake the car, and consists in various other details of construction and combinations and arrangements of parts, which will be hereinafter fully described and then specifically defined in the appended claims.

I illustrate my invention in the accompanying drawings, in which—

Figure 1 is a side elevation showing the application of my brake device to the truck of the car, the apparatus being shown in solid lines in the positions parts assume when the brake is set and in dotted lines in positions parts assume when the brake is off. Fig. 2 is a perspective view of the crank-shaft and parts connected thereto; and Fig. 3 is an enlarged detail view, in side elevation, showing the manner of holding the operated lever when the brakes are off.

Reference now being had to the details of drawings by letter, A designates the truck of a car in which the axles B are mounted in suitable bearings and which carry the wheels C.

A' designates a track upon which the car-wheels are adapted to travel.

Mounted in suitable bearings J, formed by bending the rods J' into elongated loops, as shown clearly in Fig. 2 in the drawings, is a crank-shaft E, to the ends of which are journaled the small wheels or rollers D, which have corrugated circumferences. The ends of said rods J' are fastened to the truck of the car by passing bolts or other fastening means through the ends of the rod, as shown clearly in Fig. 1 of the drawings.

F is a clevis which is mounted upon the shaft E, there being one at each end thereof, and each clevis is provided with a threaded aperture to receive the end of a rod G, which rods pass through the angled guide-plate H, which is fixed to the truck, and each rod G is provided with a nut H', mounted upon threaded ends of the rods, whereby the wheels D, about which the clevises are fastened, may be adjusted nearer to or farther from the car-wheel. A nut F' is mounted upon the lower threaded end of each rod G, whereby the lower end of the rods may also be adjusted.

To the crank $E^2$, formed at the central part of the said crank-shaft, a rod O is connected, which extends forward, and its lower end is pivotally connected at R' to the lever P, which in turn is pivotally mounted upon a pin P', mounted in the walls of a slot in the platform $A^2$ of the car.

S designates a plate which is vertically disposed and is mounted upon a pin S', and the upper edge of the plate is cam-shaped.

T is a spring-pressed pawl which is pivotally mounted upon the lever P, and its hooked end is designed to engage over the upper corner of said plate when the lever is thrown forward at its farthest forward throw in the act of holding the corrugated wheels from contact with the car-wheels and track.

The operation of my invention is simple and is as follows: The corrugated wheels or rollers being held in the positions shown in dotted lines in Fig. 1 and in the event of it being desired to apply the brake quickly, the pawl T is released from the plate S and the lever thrown in the position shown in solid lines in Fig. 1, which will cause the two corrugated wheels to be thrown immediately in front of the two wheels upon the opposite ends of one of the axles, as shown in solid lines, and serve to cause the truck to come to a sudden stop. Owing to the circumferences of the wheels being corrugated, there will be little slipping intermediate the contact parts.

What I claim to be new is—

1. An emergency-brake comprising, in combination with a car-truck, axles and car-wheels, tracks upon which the wheels rest, a crank-shaft, corrugated wheels journaled upon the ends of said shaft, an operating-lever, pivotal connections between same and said shaft whereby said corrugated wheels may be thrown in front of the car-wheels and between the same and track, as set forth.

2. An emergency-brake comprising, in combination with a car-truck, axles and car-wheels, tracks upon which the wheels rest, a crank-shaft, corrugated wheels journaled upon the ends of said shaft, adjusting-rods connected to the ends of the crank-shaft and held by a guide-plate upon the truck, an operating-lever, pivotal connections between same and the crank-shaft, as set forth.

3. An emergency-brake comprising, in combination with a car-truck, axles and car-wheels, tracks upon which the wheels rest, a crank-shaft, corrugated wheels journaled upon the ends of said shaft, a clevis mounted upon each end of the crank-shaft and between which the corrugated wheels rotate, an adjusting-rod carried by the truck and engaging said clevises, an operating-lever and connections between the same and said crank-shaft, as set forth.

4. An emergency-brake comprising, in combination with a car-truck, axles and car-wheels, tracks upon which the wheels rest, a crank-shaft, corrugated wheels journaled upon the ends of said shaft, a clevis mounted upon each end of the crank-shaft and between which clevises said corrugated wheels rotate, each clevis being apertured, a threaded rod passing through the aperture of said clevis, a nut upon the threaded portion of the rod, a guide-plate upon the truck and through which said rods pass, nuts upon the upper threaded ends of said rods, pivotal operating-lever and connections between same and the crank-shaft, as set forth.

5. An emergency-brake comprising, in combination with the truck of a railway-car, axles and car-wheels, tracks upon which the wheels travel, a crank-shaft mounted upon the truck, corrugated wheels mounted upon the ends of said crank-shaft, a pivotal operating-lever mounted upon the platform of the car, connections between the same and the crank-shaft, a vertically-disposed plate, a spring-pressed pawl carried by the operating-lever and adapted to engage over the upper corner of said plate, as set forth.

6. An emergency-brake comprising, in combination with the truck of a car with axles and wheels thereto, a track, rods which are bent to form loops and fastened to the truck, a crank-shaft mounted in said loops, corrugated wheels mounted on the ends of said crank-shaft, adjusting-rods connected to the ends of said shafts, a pivotal operating-lever and connections between the same and the crank-shaft, as set forth.

In testimony whereof I hereunto affix my signature in the presence of two witnesses.

PHILLIP WILLIAM COUNSELMAN.

Witnesses:
R. H. S. SPENCER,
ERNEST PATTERSON.